Oct. 2, 1928.
C. C. FARMER
1,685,842
FLUID PRESSURE BRAKE
Filed Oct. 21, 1926
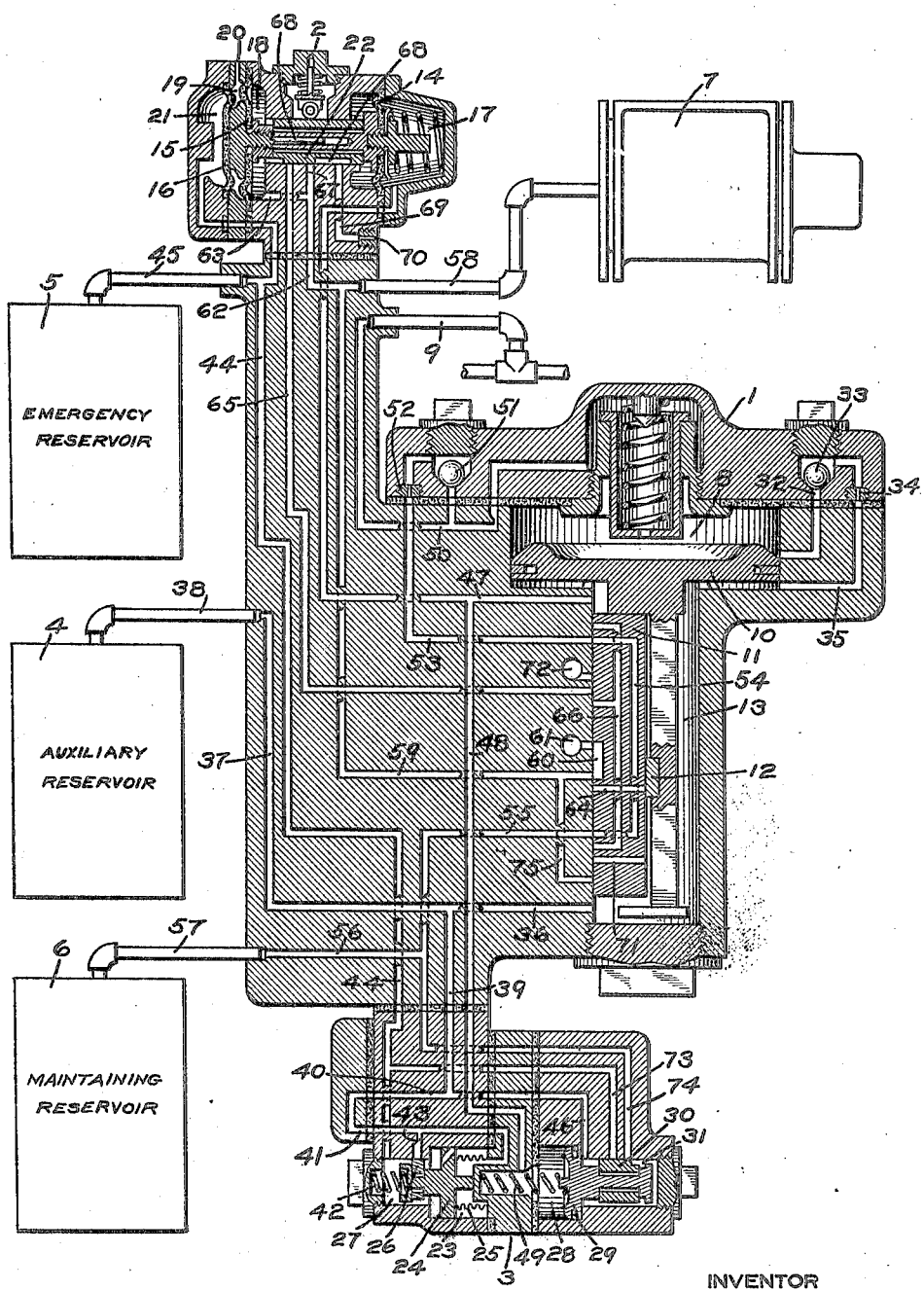
INVENTOR
CLYDE C. FARMER
BY Wm. W. Cady
ATTORNEY Patented Oct. 2, 1928.

1,685,842

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FLUID-PRESSURE BRAKE.

Application filed October 21, 1926. Serial No. 143,153.

This invention relates to fluid pressure brakes, and more particularly to a brake equipment of the type having means for maintaining brake cylinder pressure at any desired degree, during a service application of the brakes.

In a prior application of Clyde C. Farmer and Thomas H. Thomas, Serial No. 79,542 filed January 6, 1926, means for controlling and maintaining brake cylinder pressure during a service application of the brakes are disclosed.

According to the application above referred to when releasing the brakes directly, the brake cylinder exhaust is controlled by the main slide valve of the triple valve device, and when a service application of the brakes is made, if leakage from the brake cylinder should occur, fluid under pressure is supplied from a maintaining reservoir to the brake cylinder to compensate for said leakage.

If the brake cylinder leakage should be sufficient to cause a drop in the maintaining reservoir pressure to equal that in the auxiliary reservoir, then further brake cylinder leakage would cause a drop in pressure in both the maintaining and auxiliary reservoirs, since the maintaining reservoir is separated from the auxiliary reservoir by a check valve which permits flow from the auxiliary reservoir to the maintaining reservoir.

If brake cylinder leakage should be sufficient to cause a reduction in auxiliary reservoir pressure, in the above described manner, the brake pipe pressure on the triple valve piston, opposing the auxiliary reservoir pressure on the opposite side, will cause said piston to be shifted to release position and cause an undesired release of the brakes.

One object of my invention is to provide improved means for preventing a reduction in auxiliary reservoir pressure under circumstances as above described.

If, with the brake equipment above referred to, leakage should occur from the maintaining reservoir into the brake cylinder, as for instance, in case the slide valve of the maintaining or control portion should leak when the triple valve device is in service lap position, an undesired high brake cylinder pressure would develop.

Another object of my invention is, therefore, to provide means to prevent the development of an undesired high brake cylinder pressure under circumstances as above described.

In the accompanying drawing, the single figure is a diagrammatic, section view of a fluid pressure brake equipment, embodying my invention.

According to the drawing, the brake equipment may comprise a triple valve device 1, having associated therewith a maintaining or control valve portion 2, a check valve portion 3, an auxiliary reservoir 4, an emergency reservoir 5, a maintaining reservoir 6, and a brake cylinder 7.

The triple valve device 1 may comprise a casing having a chamber 8, connected to the usual brake pipe 9 and containing a piston 10, adapted to operate a main slide valve 11 and an auxiliary slide valve 12, contained in valve chamber 13.

The maintaining or control valve portion 2 may comprise a casing containing three diaphragm heads, 14, 15, and 16, forming chamber 17 connected to the auxiliary reservoir 4, chamber 18 connected to the brake cylinder 7, chamber 19 connected to the atmosphere through port 20, and chamber 21 connected to the emergency reservoir 5. Said diaphragm heads are adapted to be operated by variations in fluid pressure in chambers 17 and 18, for controlling a slide valve 22 contained in chamber 18.

The check valve portion 3 may comprise a casing having a chamber 23, containing a diaphragm head 24 connected to a bellows diaphragm 25, and adapted to operate a slide valve 26 contained in valve chamber 27, said slide valve being adapted to control the connection through which the emergency reservoir 5 is charged from the auxiliary reservoir 4.

The check valve portion 3 also has a chamber 28 containing a piston 29, adapted to control a slide valve 30 in valve chamber 31. The slide valve 30 is adapted to be operated by the piston 29, upon movement of the triple valve device to emergency application position, to connect the maintaining reservoir 6 and the emergency reservoir 5 with the auxiliary reservoir 4, so that a high brake cylinder pressure will be obtained in an emergency application of the brakes, due to the equalization of the pressure of all three reservoirs into the brake cylinder 7.

In operation, to charge the brake equipment, when the brake pipe is charged with fluid under pressure, fluid from the brake pipe 9 flows into piston chamber 8 of the triple valve device 1, thence through passage 32, past ball check valve 33, through a restricted port 34, and passage 35 into valve chamber 13, which is in constant communication with the auxiliary reservoir 4, through passages 36 and 37 and pipe 38.

Fluid under pressure from passage 36 flows through passages 39, 40, and 41 to the face of the diaphragm head 24, inside of the bellows diaphragm 25, and moves said head and slide valve 26 against the force of spring 42, to a position in which slide valve 26 opens communication from passage 41, through a restricted port 43, to valve chamber 27, and valve chamber 27 being connected to the emergency reservoir 5, through passage 44 and pipe 45, the emergency reservoir 5 is charged with fluid at auxiliary reservoir pressure, and chamber 21, of the maintaining or control portion, being connected to the emergency reservoir, the diaphragm 16 is subject to emergency reservoir pressure.

When the emergency reservoir 5 is charged to substantially the same pressure as that in the auxiliary reservoir 4, spring 42 moves diaphragm head 24 and slide valve 26 so as to cut off communication from passage 41 to the valve chamber 27.

Fluid at auxiliary reservoir pressure also flows through passages 36 and 39 to passage 46, and thence into valve chamber 31 of the check valve portion 3. Fluid at auxiliary reservoir pressure, from valve chamber 13 of the triple valve device 1, is also supplied to piston chamber 28 of the check valve portion 3, through passages 47 and 48. The fluid pressure being balanced on opposite sides of the piston 29, the spring 49 shifts the piston 29 and slide valve 30 to the position shown, in which the slide valve closes connections in the seat from the emergency reservoir 5 and the maintaining reservoir 6.

Fluid at auxiliary reservoir pressure is also supplied from passage 47 to chamber 17 of the maintaining or control portion 2, wherein it acts against the diaphragm head 14.

The maintaining reservoir 6 is charged with fluid under pressure from the brake pipe 9, through passage 50, past ball check valve 51, through restricted port 52, and passage 53, thence through port 54, in the main slide valve 11 of the triple valve device 1, and passages 55 and 56, and pipe 57.

In the release position of the triple valve device 1, the brake cylinder 7 is connected to the atmosphere through pipe 58, passage 59, cavity 60 in the main slide valve 11 of the triple valve device 1, and exhaust port 61.

Valve chamber 18, of the maintaining or control portion 2, being connected to passage 59, through passages 62 and 63, is likewise at atmospheric pressure, when the triple valve device is in release position.

In order to effect a service application of the brakes, a gradual reduction in the pressure of the fluid in the brake pipe 9 is made, and consequently in piston chamber 8 of the triple valve device 1, causing the triple valve to move to service position in which fluid at auxiliary reservoir pressure, in valve chamber 13, flows through the service port 64 into passage 59, and thence by pipe 58 to the brake cylinder 7, causing an application of the brakes.

Fluid at brake cylinder pressure from passage 59, is also supplied through passages 62 and 63 to valve chamber 18 of the maintaining or control portion 2.

If the brake cylinder pressure, obtained during the service application, is in the proper ratio to the reduction in auxiliary reservoir pressure, and since the auxiliary reservoir is in constant communication with chamber 17 of the maintaining or control portion 2, the decrease in pressure in chamber 17 and increase in pressure in chamber 18 of the maintaining or control portion 2 is such that the maintaining or control portion 2 does not operate, and slide valve 22 remains in the position shown in the drawing.

If the pressure of the fluid in the brake cylinder 7, and consequently in chamber 18 of the maintaining or control portion 2, becomes reduced through leakage to the atmosphere, the balance of pressures on the diaphragm heads 14, 15, and 16, is upset, so that said diaphragm heads operate to shift the slide valve 22 to the right to a position in which fluid at maintaining reservoir pressure is supplied from passage 65, past the end of slide valve 22 to chamber 18, and thence to the brake cylinder 7. When the pressure of the fluid in the brake cylinder 7 is thus restored to correspond with the reduced auxiliary reservoir pressure, in chamber 17, the increase of pressure in valve chamber 18 restores the balance of fluid pressures on the diaphragm heads and causes the slide valve 22 to be shifted to the position in which communication between the maintaining reservoir 6 and brake cylinder 7 is cut off.

The maintaining or control portion 2 will operate, as above described, to maintain brake cylinder pressure against leakage to the atmosphere, until the pressure of the fluid in the maintaining reservoir 6 becomes reduced to equal the pressure in the brake cylinder 7, after which, the maintaining or control portion 2 will remain in the position in which the maintaining reservoir 6 is connected to the brake cylinder 7, thereby increasing the volume from which leakage from the brake cylinder to the atmosphere takes place, and consequently reducing the rate at which the pressure in the brake cylinder 7 is reduced by such leakage.

After the initial flow of fluid under pressure from the auxiliary reservoir 4 to the brake cylinder 7, the triple valve device 1 moves to service lap position, in which it remains, unless later influenced to change its position by a further change in brake pipe pressure.

Since in service lap position the service port 64, through the main slide valve 11, is closed by the auxiliary slide valve 12, no further flow of fluid from the auxiliary reservoir to the brake cylinder can occur, and since the maintaining and auxiliary reservoirs are never connected together except in emergency, the maintaining of brake cylinder pressure, on account of leakage, can only deplete the maintaining reservoir. The pressure in the auxiliary reservoir thus remaining constant, prevents an undesired release of the brakes.

If during a service application of the brakes, when the maintaining reservoir passage 65 is lapped by the slide valve 22, of the maintaining or control portion 2, leakage should occur from passage 65 into valve chamber 18, on account of leakage between the slide valve 22 and its seat, the pressure of the fluid in chamber 18 and in the brake cylinder 7 will be increased, which will then unbalance the pressures acting on the diaphragm heads 14, 15, and 16, so that said heads will operate to shift the slide valve 22 to the left, to a position in which passage 67, from the chamber 18 of the maintaining or control portion 2 and the brake cylinder 7, will be connected to atmosphere through cavity 68 in slide valve 22, passage 69 and a restricted port 70, thereby permitting a reduction in the pressure in chamber 18 and the brake cylinder 7. The pressure in chamber 18 is thus reduced, so that the equilibrium of the pressures acting on the diaphragm heads 14, 15, and 16 is restored, and the diaphragm heads then act to shift the slide valve 22 back to the position in which communication between the brake cylinder 7 and the atmosphere is cut off.

To produce an emergency application of the brakes, a sudden reduction in brake pipe pressure is effected, causing the triple valve device 1 to move to emergency position in the usual manner. Port 71 in the main slide valve 11 of the triple valve device 1 then registers with passage 55 from the maintaining reservoir 6 and permits the fluid in said reservoir to flow into valve chamber 13 of the triple valve device 1.

In the emergency position of the slide valve 11, chamber 28 of the check valve portion 3 is vented to atmosphere through passages 48 and 47, cavity 66 in the main slide valve 11, and exhaust port 72. The auxiliary reservoir pressure in valve chamber 31, of the check valve portion 3, then shifts the piston 29 and slide valve 30 against the atmospheric pressure in chamber 28 and the pressure of spring 49, so that the slide valve 30 uncovers passage 73 from the emergency reservoir 5, and passage 74 from the maintaining reservoir 6, and thus both the emergency and the maintaining reservoirs are connected to the valve chamber 31 and thus to the auxiliary reservoir. As a consequence, fluid from the three reservoirs flows into valve chamber 13 of the triple valve device 1 and thence through passage 75, which is uncovered by the main slide valve 11, passage 59 and pipe 58 to the brake cylinder 7, wherein a high emergency pressure is developed.

To prevent the maintaining or control portion 2 from operating to vent fluid at this high pressure from the brake cylinder to atmosphere, in emergency position of the triple valve device 1, as would be the case if a service application had been made, as hereinbefore described, the chamber 17 of the maintaining or control portion 2, is vented to atmosphere through passage 47, cavity 66 in the main slide valve 11 of the triple valve device 1 and the exhaust passage 72. The pressures then acting on the diaphragm heads 14, 15, and 16, of the maintaining or control portion 2, are such as to shift and hold the slide valve 22 in its extreme right hand position, in which the maintaining reservoir 6 is connected to the brake cylinder 7 by way of passage 65, and valve chamber 18, and the exhaust passage 69 is cut off from the brake cylinder passage 67.

Recharging the brake equipment and releasing the brakes after a service application is effected by increasing the pressure of the fluid in the brake pipe 9, which causes the triple valve device 1 to move to release position, in which the auxiliary reservoir 4 and the maintaining reservoir 6 are recharged in the same manner as when initially charging the brake equipment, as hereinbefore described. The brake cylinder 7 is also vented to the atmosphere in this position.

Recharging the brake equipment and releasing the brakes after an emergency application, occur in the same manner as after a service application except that in addition emergency reservoir is recharged in the same way as described in connection with the initial charging of the brake equipment.

Having now described my invention, what

I claim as new and desire to secure by Letters Patent, is:—

1. In a fluid pressure brake, the combination with a brake pipe, auxiliary reservoir, brake cylinder, and triple valve device operated upon a reduction in brake pipe pressure for supplying fluid from the auxiliary reservoir to the brake cylinder, of a maintaining reservoir, a valve device for controlling the supply of fluid from said maintaining reservoir to the brake cylinder, and means for charging said maintaining reservoir with fluid under pressure from the brake pipe through ports controlled by said triple valve device.

2. In a fluid pressure brake, the combination with a brake pipe, auxiliary reservoir, brake cylinder, and triple valve device having a piston and slide valve and operated upon a reduction in brake pipe pressure for supplying fluid from the auxiliary reservoir to the brake cylinder, of a maintaining reservoir, a valve device for controlling the supply of fluid from the maintaining reservoir to the brake cylinder, and means for charging said maintaining reservoir with fluid under pressure from the brake pipe through ports controlled by said slide valve.

3. In a fluid pressure brake, the combination with a brake pipe and a brake cylinder, of a maintaining valve device subject to fluid under pressure varying in accordance with variations in brake pipe pressure and operated upon a reduction in brake cylinder pressure for supplying fluid to the brake cylinder and upon an increase in brake cylinder pressure for venting fluid from the brake cylinder.

4. In a fluid pressure brake, the combination with a brake pipe and a brake cylinder, of a maintaining valve device subject to fluid under pressure varying in accordance with variations in brake pipe pressure and operated upon a reduction in brake cylinder pressure through leakage for supplying fluid to the brake cylinder to compensate for the leakage and operated upon an increase in brake cylinder pressure through leakage of fluid under pressure into the brake cylinder, for venting fluid from the brake cylinder.

5. In a fluid pressure brake, the combination with a brake cylinder, brake pipe, auxiliary reservoir and an equalizing valve device operated upon a reduction in brake pipe pressure for supplying fluid from the auxiliary reservoir to the brake cylinder to provide a pressure in the brake cylinder having a predetermined ratio to the reduction in brake pipe pressure, of a maintaining valve device operated upon leakage from the brake cylinder varying said ratio for supplying fluid to the brake cylinder and upon leakage of fluid under pressure into the brake cylinder varying said ratio for venting fluid from the brake cylinder.

6. In a fluid pressure brake, the combination with a brake cylinder, auxiliary reservoir, and a triple valve device for controlling the supply of fluid under pressure from the auxiliary reservoir to the brake cylinder, of a maintaining valve device comprising movable abutments subject to the pressures of the auxiliary reservoir and brake cylinder and a valve operated by said means upon a reduction in brake cylinder pressure below a predetermined pressure relation with respect to the auxiliary reservoir pressure for supplying fluid to the brake cylinder, and upon an increase in brake cylinder pressure above the predetermined pressure relation to vent fluid from said brake cylinder.

7. In a fluid pressure brake, the combination with a brake cylinder, of a maintaining valve device for maintaining the pressure in the brake cylinder against leakage in a service application of the brakes and having means for venting fluid from the brake cylinder upon an increase in pressure in the brake cylinder due to leakage of fluid into the brake cylinder and means for preventing said valve device from venting fluid from the brake cylinder upon an increase in brake cylinder pressure in an emergency application of the brakes.

8. In a fluid pressure brake, the combination with a brake cylinder and auxiliary reservoir, of a maintaining valve device subject to the pressures of the auxiliary reservoir and the brake cylinder and operated in a service application of the brakes at a predetermined ratio between the auxiliary reservoir pressure and the brake cylinder pressure for supplying fluid to the brake cylinder and at another predetermined ratio between the auxiliary reservoir pressure and the brake cylinder pressure for venting fluid from the brake cylinder, and means operating in an emergency application of the brakes for preventing said valve device from venting fluid from the brake cylinder.

In testimony whereof I have hereunto set my hand.

CLYDE C. FARMER.